United States Patent
Chou

(10) Patent No.: US 6,764,564 B2
(45) Date of Patent: Jul. 20, 2004

(54) MANUFACTURING METHOD FOR SYNTHETIC LEATHER

(76) Inventor: Lung Wen Chou, No. 20, Lane 256, Haiwei Rd., Lungjing Shiang, Taichung (TW), 434

(*) Notice: Subject to any disclaimer, the term of this patent is extended or adjusted under 35 U.S.C. 154(b) by 266 days.

(21) Appl. No.: 09/989,159

(22) Filed: Nov. 21, 2001

(65) Prior Publication Data

US 2003/0094229 A1 May 22, 2003

(51) Int. Cl.⁷ .......... B32B 31/06; B32B 31/12; B32B 31/20
(52) U.S. Cl. .......... 156/78; 156/243; 156/244.27; 156/324; 264/45.5; 264/45.8; 264/45.9; 264/46.3; 264/53; 264/54
(58) Field of Search .......... 156/78, 243, 244.27, 156/246, 324; 264/45.8, 45.9, 46.2, 46.3, 45.5, 53, 54

(56) References Cited

U.S. PATENT DOCUMENTS

| | | | | |
|---|---|---|---|---|
| 3,873,406 A | * | 3/1975 | Okazaki et al. | 428/308.4 |
| 3,933,548 A | * | 1/1976 | Anderson et al. | 156/78 |
| 3,939,021 A | * | 2/1976 | Nishibayashi et al. | 156/78 |
| 3,959,049 A | * | 5/1976 | Tanaka et al. | 156/79 |
| 5,810,254 A | * | 9/1998 | Kropfield | 239/61 |
| 6,228,296 B1 | * | 5/2001 | Cartmill et al. | 264/46.2 |

* cited by examiner

*Primary Examiner*—Sam Chuan Yao
(74) *Attorney, Agent, or Firm*—Troxell Law Office PLLC

(57) ABSTRACT

A manufacturing method for a synthetic leather includes a first step of feeding materials of preset volume, a second step of materials foaming (capable to be skipped if unnecessary), a third step of material and mixing injecting to produce liquid mixed materials by instant reaction, a fourth step of conveying two basic cloths, a fifth step of compressing the two basic cloths with the liquid mixed materials producing reaction between the two basic cloths conveyed to an upper portion of two rollers to produce synthetic leather, and a sixth step of winding finished synthetic leather on two winding wheels.

6 Claims, 4 Drawing Sheets

MANUFACTURING METHOD FOR SYNTHETIC LEATHER

BACKGROUND OF THE INVENTION

This invention relates to a manufacturing method for synthetic leather, particularly to injecting and mixing several kinds of materials to produce reaction and then pouring on between two basic cloths for making a synthetic leather, not using solvent to pollute water and air, or enormous equipment used in a conventional manufacturing method.

A conventional manufacturing method for synthetic leather usually places various materials and solvent in one or several immersing tanks. Then basic cloth is guided to immerse in the materials in the tanks, subsequently the basic cloth is moved in a water tank to let its surface congeal, and then dried by means of an electric heating device to become a finished synthetic leather.

A large volume of solvent is used in the conventional manufacturing method for synthetic leather, potentially polluting heavily the environment. For example, wet-style synthetic leather uses dimethyl formamide (DMF) as solvent, which may be absorbed through human skin to the lungs to get poisoned. This chemical is listed in a toxic material table made by the Environment Protective Bureau. A factory is obligated to install equipment for collecting poisonous gas, water washing and treating waste gas according to the factory law, and all the factories and the government should record its control and management processes incessantly. Therefore, treatment of waste gas and wastewater need substantial time, work and expense, otherwise serious pollution may happen any time if carelessly controlled. In addition, the electric heating device used in the manufacturing process may use large electric power and work force for controlling.

Another kind of conventional dry-style synthetic leather is made by means of coating resin on a removable paper and dried, and then paste is coated on and adhered or with the movable paper and dried. It uses methyl ethyl ketone (MEK), which may cause acute toxipathic hepatitis, and another chemical, xylene, used in the manufacturing method is highly inflammable by heat, a spark or flame, causing a fire very easily, and polluting air and water as well. An electric drying device is also used, wasting large expense for electricity and managing force.

Moreover, manufacturing equipment used in the conventional manufacturing methods for synthetic leathers are impossible to make plastic foam treatment directly contained in the continual manufacturing processes.

SUMMARY OF THE INVENTION

The main objective of the invention is to offer a manufacturing method for a synthetic leather, not using any solvent, not needing a waste gas washing accommodation so that there is no pollution to air and water, saving expense for the accommodation, work force and electricity.

Another objective of the invention is to offer a manufacturing method for synthetic leather, including a foaming process used in case of need, directly connected with other manufacturing processes for continual treatment so as to manufacture synthetic leather with or without foam structure.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
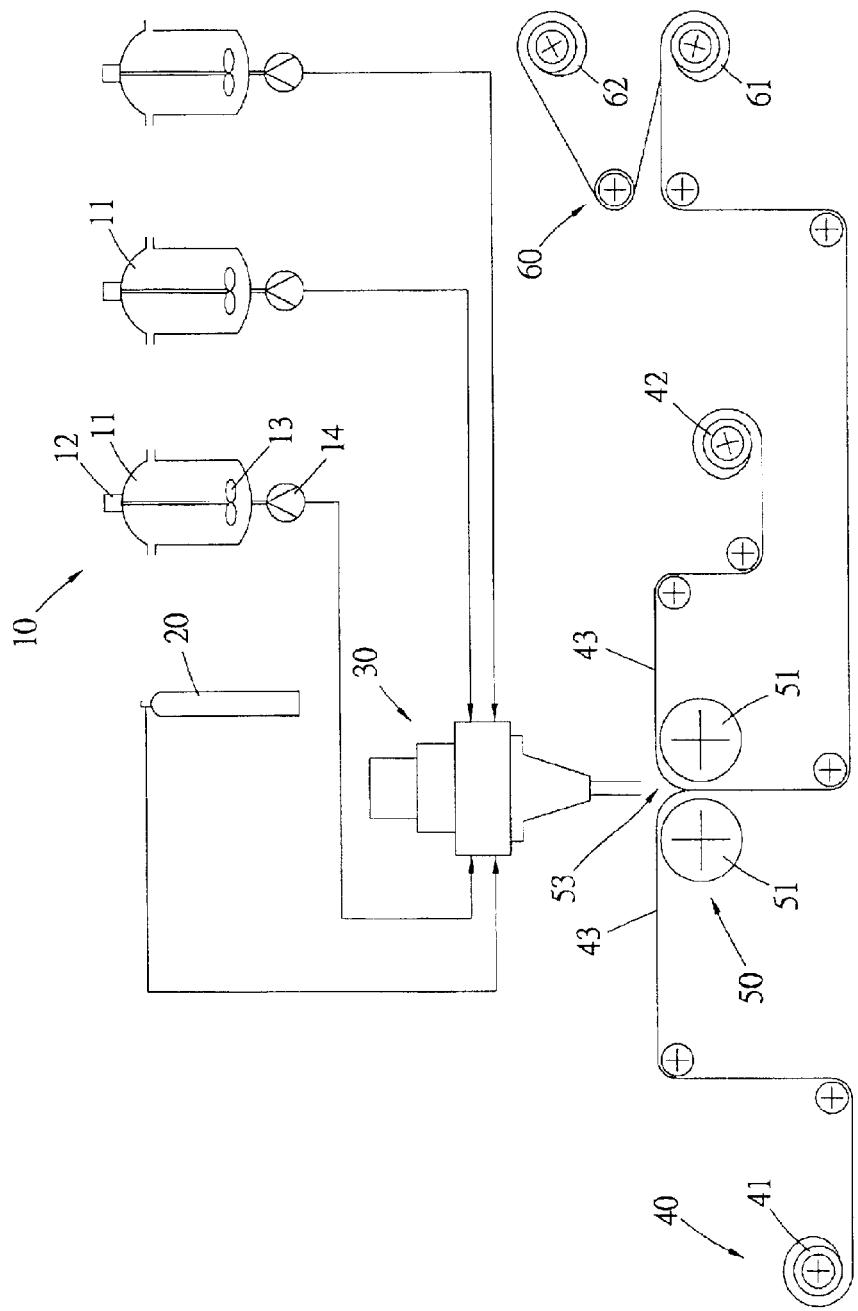
FIG. 1 is a flow chart of a manufacturing method for synthetic leather in the present invention.
Figure 2:
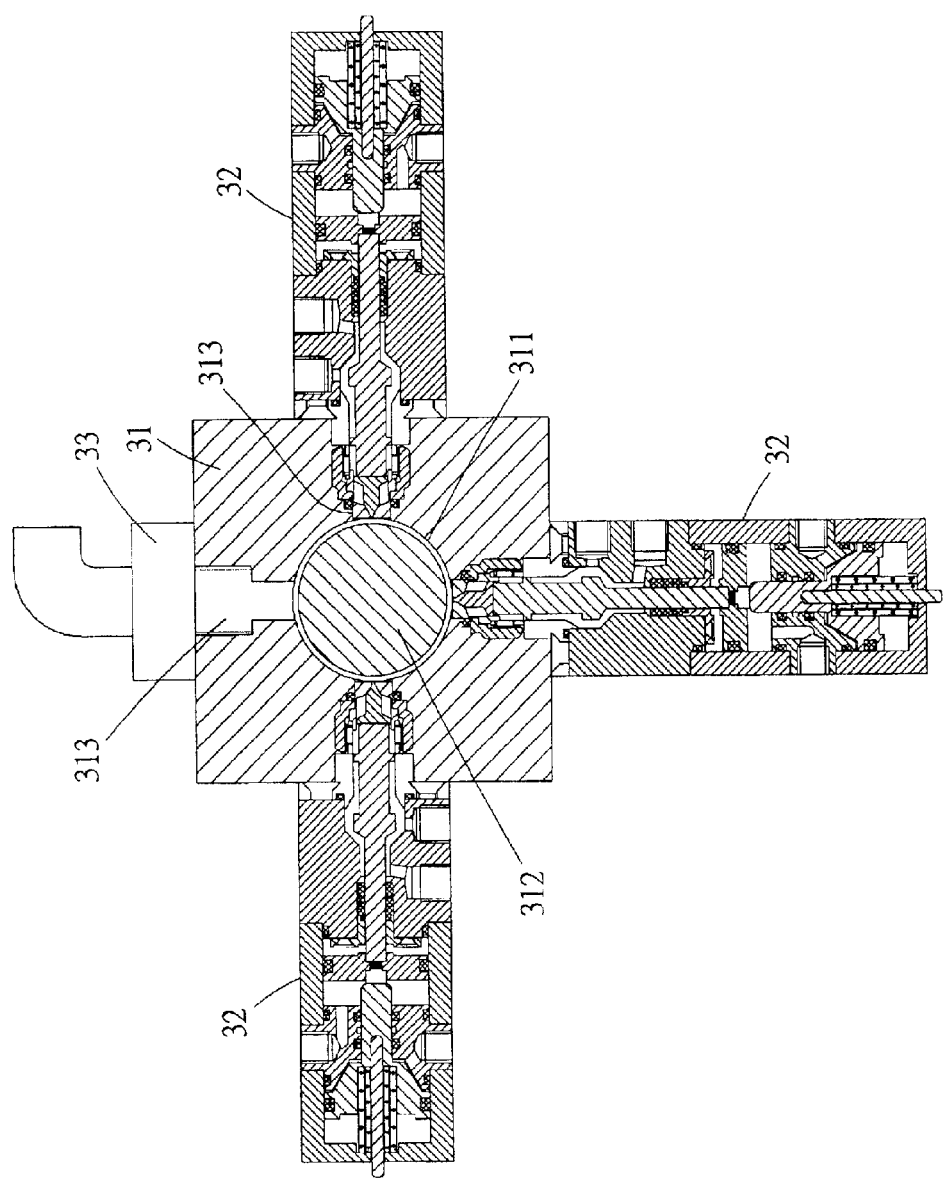
FIG. 2 is a lateral cross-sectional view of an injecting mixing device used in the manufacturing method for synthetic leather in the present invention.

A preferred embodiment of a manufacturing method for a synthetic leather in the present invention, as shown in FIGS. 1 and 2, includes a first step of material measuring and feeding, a second step of material foaming, a third step of materials injecting and mixing, a fourth step of basic cloth conveying, a fifth step of compressing two basic cloths with liquid mixed materials flowing down between to produce finished synthetic leather, and a sixth step of winding finished synthetic leather.

The first step of material feeding is carried out by a measuring and feeding device 10, which includes various tanks 11 respectively having a stirrer 13 driven by a motor 12 and a definite-volume pump 14 fixed on the bottom to feed out the material of a definite volume from the tanks 11. In this embodiment, three material tanks 11 are used, a first tank stores PU resin (isocyanate polymer containing NCO), a second tank polyol containing OH, and a third tank a pigment.

The second step of foaming is carried out by a foaming device 20, which feeds out a foaming agent such as gaseous nitrogen, as, water or physical foaming chemicals.

Figure 4:
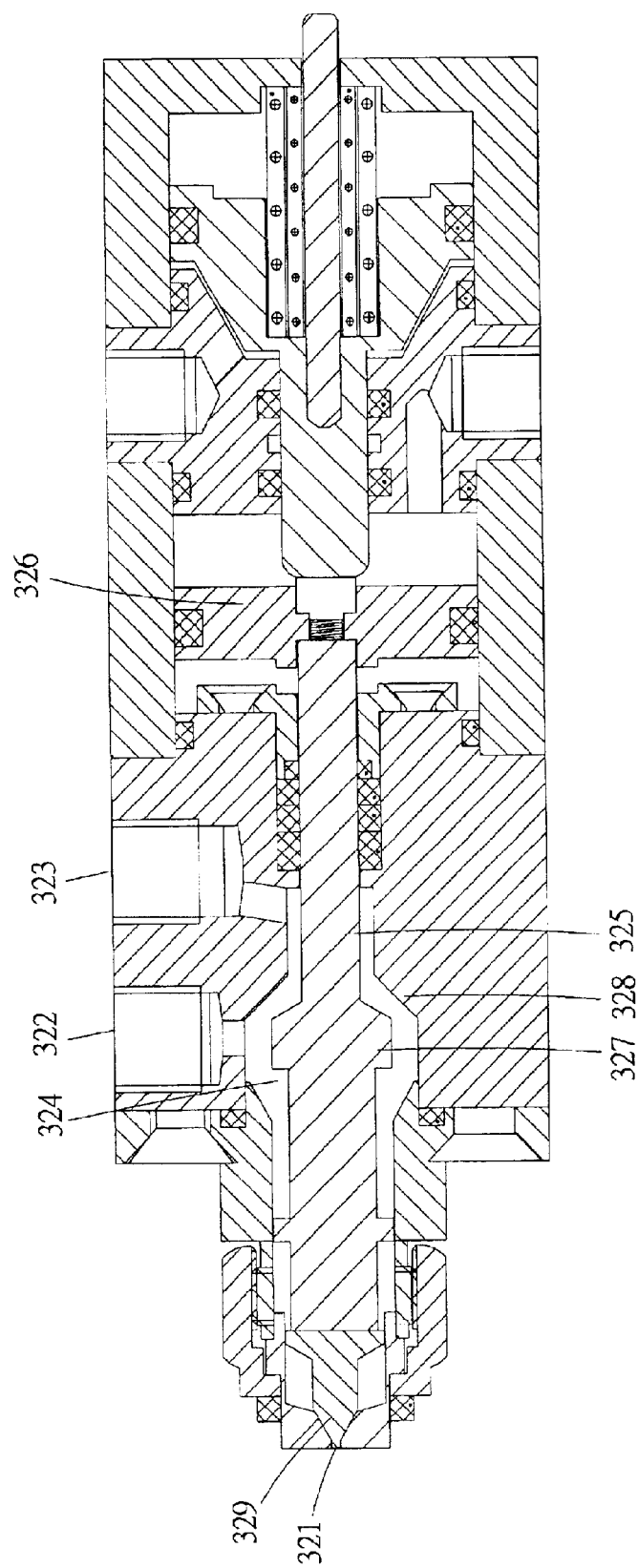

The third step of material mixing and injecting is carried out by a material injecting mixing device 30, which mixes and injects out liquid mixed materials as shown in FIGS. 2 and 4, consisting of a mixing and injecting head 31, three material feeders 32 and a connector 33.

Figure 3:
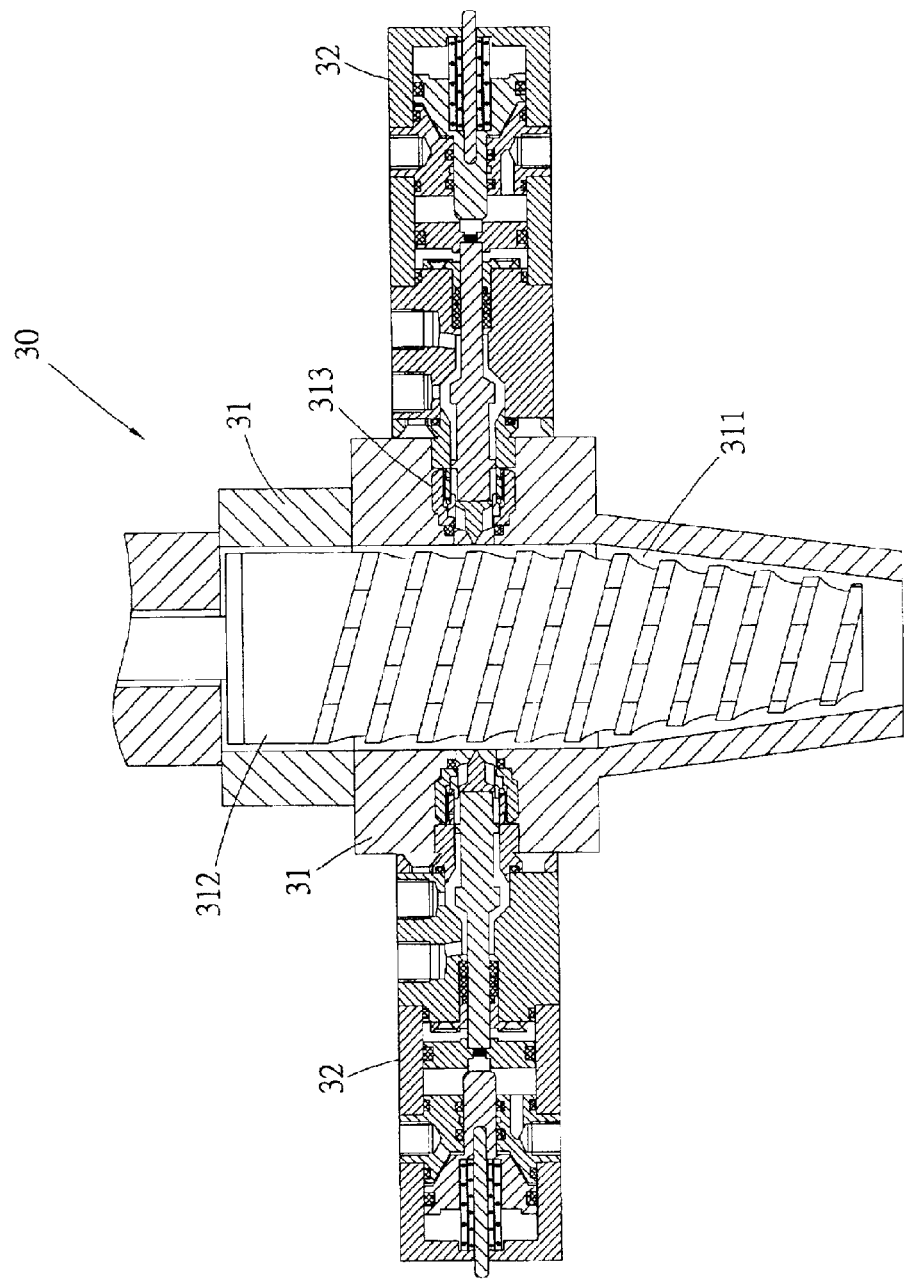
FIG. 3 is a lengthwise cross-sectional view of the injecting mixing device used in the manufacturing method for synthetic leather in the present invention; and, FIG. 4 is a cross-sectional view of a material feeder used in the manufacturing method for synthetic leather in the present invention.

The mixing and injecting head 31 of the injecting mixing device 30 has a center lengthwise mixing hole 311, a rotatable threaded rod 312 fitted in the mixing hole 311, as shown in FIGS. 2 and 3. The mixing and injecting head 31 has four lateral pivotal holes 313 respectively in four sides, with each pivotal hole 313 communicating with the lengthwise center mixing hole 311.

Each feeder 32 has an injecting hole 321 formed in a front center, an inlet 322 in an upper side, a return hole 323 beside the right side of the inlet 322, an inner chamber 324 formed lengthwise in the intermediate portion, a control rod 325 deposited in the inner chamber 324, and a piston 326 connected with the end of the control rod 325. When the control rod 325 retreats, a stop section 327 of a little larger diameter than the rest of the rod 325 formed in a intermediate portion fits with a stop annular sloped surface 328 of the wail defining the chamber 324, separating the chamber 324 in a closed direction. Then a stop needle 329 in the front end of the control rod 325 does not block the injecting hole 321, which is then in an open condition, permitting each material injected out through each pivotal hole 313 and then in the mixing hole 311 of the injecting mixing head 31. On the contrary, when the control rod 325 is moved forward, the material stop needle 329 fits in the injecting hole 321, each material flows from the inlet 322 into the chamber 324 and flows back to the various tanks 11 via the return holes 323. Besides, the connector 33 is connected with a tube route of the foaming device 20 for gas, water or physical foaming agent to flow in the mixing hole 311 through the pivotal holes 313.

In this embodiment, isocyanate polymer and polyol, a pigment and nitrogen coming from the foaming device mix together in the mixing hole 311 of the mixing and injecting head 31 to produce instant reaction to become liquid mixed materials, as shown in FIG. 1, and then flowing automatically down vertically to be injected out.

The fourth step of basic cloths conveying is carried out by two basic cloth conveying devices 40, one 41 fixed below one side of the mixing and injecting device 30 and the other 42 below the other side of the device 30. Two basic cloths 43 each wound on a cylinder are respectively pulled out and conveyed by the two conveying devices 41, 42 to the bottom center position of the mixing and injecting device 30. The basic cloths 43 may be cloth, removable paper, plastic skin, etc.

The fifth step of compressing the liquid mixed materials between the two basic cloths is carried out by a vertical compressing and flowing control device 50, positioned below the mixing and injecting device 30, consisting of two parallel rollers 51 for compressing two basic cloths coming from the two basic cloth conveying devices 41, 42, guiding the two basic cloths on top of the rollers 51 to the gap between the two rollers to collide with each other and move down and being compressed together at the same time. A vertical flowing section 53 is formed on the contacting location of the two parallel rollers 51, and the liquid mixed materials instantly reacting in the mixing and injecting head 31 will flow down between the two basic cloths 43 moving to the gap between the rollers 50, 51. Then the two basic cloths are compressed between the two rollers 51 with the liquid mixed materials sandwiched between the two basic cloths 43, which is then becomes finished synthetic leather. The two parallel rollers 51 can be adjusted with a gap between them to control the thickness of the liquid mixed materials between the two basic cloths 43, in other words, the thickness of finished synthetic leather.

The last sixth step of winding finished synthetic leather is carried out by a winding device 60, which consists of a first winding wheel 61 and a second winding wheel 62 positioned just above the first winding wheel 61. Provided removable paper is used, it is peeled off before finished synthetic leather is wound on the first or the second winding wheel.

The main feature of the invention is that materials are fed by the measuring and mixing, device, which includes one tank storing isocyanate containing NCO, another tank storing polyol containing OH, the definite-volume pump provided with each tank to feed a measured definite volume of liquid materials to the mixing and injecting device, which then injects all the materials in the mixing chamber to mix together and instantly those materials react with each other and form liquid mixed materials flowing down vertically on the basic cloths and then compressed by the two rollers with the liquid mixed materials between the two basic cloths to produce polyurethane (PU) synthetic leather.

The synthetic leather of 100% of polyurethane in the invention is manufactured by utilizing functional groups of isocyanate reacting instantly with functional groups of polyol.

The invention does not use any solvent, so the conventional waste-gas washing accommodation is not necessary, with no pollution of air and water.

In addition, the invention uses a catalyst for direct reaction to produce hardening action for manufacturing, not needing electric heating device, saving expenses relative to the device.

Moreover, the foaming device can be used readily for foamed synthetic leather, or not used for manufacturing non-foamed synthetic leather.

While the preferred embodiment of the invention has been described above, it will be recognized and understood that various modifications may be made therein and the appended claims are intended to cover all such modifications that may fall within the spirit and scope of the invention.

What is claimed is:

1. A manufacturing method for a synthetic leather, which comprises the steps of:
    a) measuring and feeding materials utilizing a measuring and conveying device for measuring liquid materials having at least one first tank storing a liquid isocyanate polymer containing NCO and at least one second tank storing a liquid polyol containing OH;
    b) foaming utilizing a foaming device for feeding out a foaming agent;
    c) mixing and injecting materials utilizing an injecting and mixing device having a mixing and injecting head with a lengthwise center mixing hole and a rotatable threaded rod inserted into the center mixing hole, the injecting and mixing device mixing liquid materials from the measuring and conveying device and the foaming agent from the foaming device that is fed into the lengthwise center mixing hole with the rotatable threaded rod to form liquid mixed materials, and vertically discharging the liquid mixed materials;
    d) conveying two cloths utilizing two spaced apart cloth conveying devices, the two cloths located below the measuring and conveying device;
    e) compressing the liquid mixed materials between the two cloths by positioning a vertical compressing and flowing control device below the injecting and mixing device, conveying the two cloths between two parallel rollers in the vertical compressing and flowing control device, positioning the liquid mixed materials vertically discharged from the injecting and mixing device between the two cloths before the two cloths converge and enter the two parallel rollers, and compressing the liquid mixed materials and the two cloths between the two parallel rollers to form the synthetic leather; and
    f) winding the synthetic leather utilizing a winding device.

2. The manufacturing method for a synthetic leather according to claim 1, wherein the measuring and feeding step a) includes utilizing a plurality of definite volume pumps, each of the plurality of definite volume pumps connected to one of the plurality of first and second tanks for measuring the liquid materials contained therein.

3. The manufacturing method for a synthetic leather according to claim 1, wherein the mixing and injecting step c) includes flowing the liquid materials through a plurality of feeders in the injecting and mixing device before the liquid materials are mixed in the lengthwise center mixing hole, each of the plurality of feeders having an injection hole, an inlet, a return hole, and a control rod, wherein the liquid materials flow into the inlet and out of one of the injecting hole and the return hole.

4. The manufacturing method for a synthetic leather according to claim 1, wherein the foaming step b) uses the foaming agent selected from the group of foaming agents consisting of gaseous nitrogen, gas, water, and physical foaming chemicals.

5. The manufacturing method for a synthetic leather according to claim 1, wherein the conveying step d) uses two cloths selected from the group of cloths consisting of cloth, removable paper, and plastic skin.

6. The manufacturing method for a synthetic leather according to claim 1, wherein the compressing step e) forms the synthetic leather with a predetermined thickness by adjusting a distance between the parallel rollers in the vertical compressing and flowing control device.

* * * * *